B. C. BLOMSTEN.
Plow.
No. 108,095.
Patented Oct. 11, 1870.
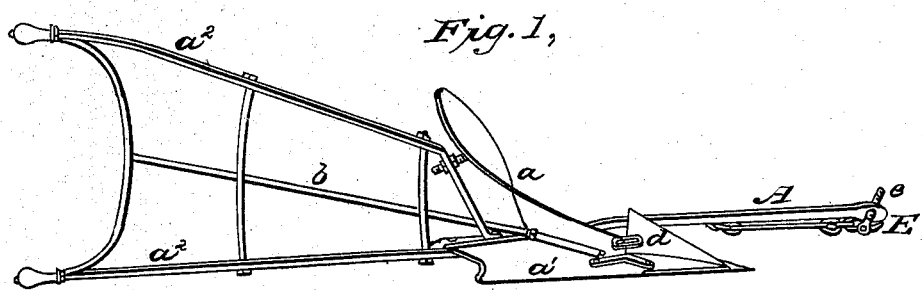
Fig. 1,
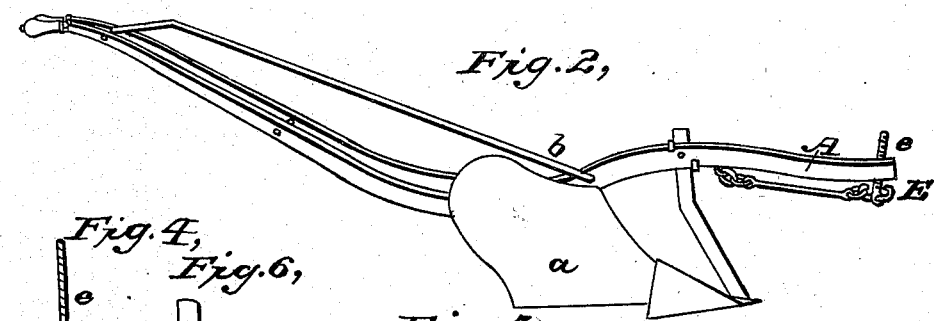
Fig. 2,
Fig. 4, Fig. 6,
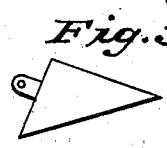
Fig. 5,
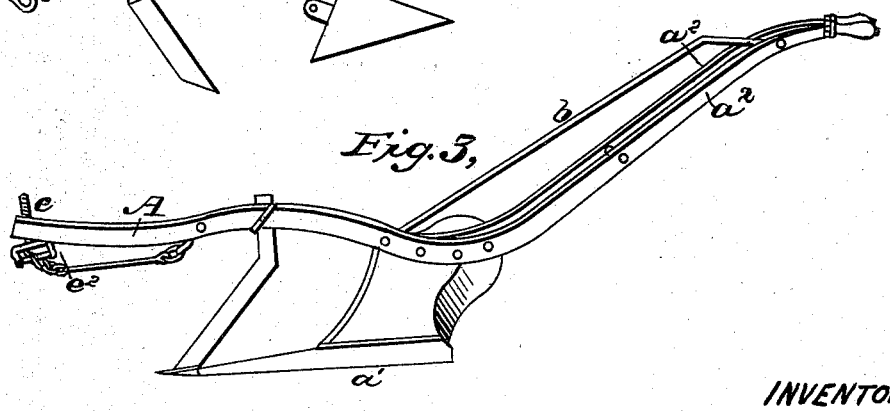
Fig. 3,
WITNESSES:
INVENTOR:

UNITED STATES PATENT OFFICE.

BENGT C. BLOMSTEN, OF WAUPACA, WISCONSIN.

IMPROVEMENT IN PLOWS.

Specification forming part of Letters Patent No. 108,095, dated October 11, 1870.

I, BENGT C. BLOMSTEN, of Waupaca, in the county of Waupaca and State of Wisconsin, have invented certain Improvements in Plows, of which the following is a specification:

This invention relates to that class of plows which are provided with adjustable mold-boards; and consists in certain details of construction, which will be fully described hereinafter.

In the drawing, Figure 1 represents a plan view of my improved plow; Figs. 2 and 3, side elevations; and Figs. 4, 5, and 6, views of parts detached.

To enable others skilled in the art to make and use my invention, I will now proceed to describe fully its construction and manner of operation.

The beam A of my plow is made of two similar parts of wrought-iron, securely bolted together, with an intervening space, in which the colter is secured. The mold-board $a$ and land-side $a^1$ are securely bolted to the beam A, as are also the handles, as is clearly shown in the drawing. To further support the handles, I employ a brace-rod, $b$, which is attached at its front end to the beam above the mold-board, and at its rear end to the cross-bar, uniting the handles at their rear ends.

The mold-board is hinged to the land-side at its front end, and attached to the right handle at its rear end by a threaded rod and nut, $c$, as shown in Fig. 1. The mold-board is also connected to this point by means of a link, $d$. By means of this construction and that of the threaded rod, the mold-board may be adjusted to turn a wider or narrower furrow, as may be desired.

The form of the mold-board is peculiarly adapted for the purpose of laying the sward over flat. The beam, also, is curved, to make room for the passage of the stubble, &c., without clogging.

The draft attachment E, as shown in Fig. 4, is peculiar. The clevis is provided with a threaded rod, $e$, by means of which it is adjusted vertically, and the draft-hook has an eye, $e^1$, provided with threads, which is held by a threaded rod, $e^2$, uniting the ends of the clevis. By means of this construction the draft-hook may be adjusted laterally.

This plow is especially adapted for breaking new land, but may be used for other purposes.

Having thus fully described my invention, what I claim as new, and desire to secure by Letters Patent of the United States, is—

The plow described, consisting of the beam A, handles $a^2$, mold-board $a$, point, colter, brace-rod $b$, and draft attachment E, when combined as described, for the purpose set forth.

BENGT C. BLOMSTEN.

Witnesses:
OLOF E. DREUTZERS,
JENS HANSEN.